(12) United States Patent
Kee

(10) Patent No.: US 8,054,610 B2
(45) Date of Patent: Nov. 8, 2011

(54) RADIAL LEAD ALUMINUM ELECTROLYTIC CAPACITOR

(75) Inventor: Lik Wing Kee, Dongguan (CN)

(73) Assignee: Samxon Eelctronics (Dong Guan) Co., Ltd., Guangdong Province (CN)

( * ) Notice: Subject to any disclaimer, the term of this patent is extended or adjusted under 35 U.S.C. 154(b) by 509 days.

(21) Appl. No.: 12/219,461

(22) Filed: Jul. 23, 2008

(65) Prior Publication Data

US 2009/0310284 A1     Dec. 17, 2009

(30) Foreign Application Priority Data

Jun. 13, 2008  (CN) .......................... 2008 1 0110683

(51) Int. Cl.
*H01G 9/04*   (2006.01)
*H01G 9/145*  (2006.01)

(52) U.S. Cl. ........................................ 361/516; 361/511

(58) Field of Classification Search .......... 361/511–516, 361/530–532
See application file for complete search history.

(56) References Cited

U.S. PATENT DOCUMENTS 3,988,650 A * 10/1976 Fritze ............................. 361/511
6,307,733 B1 * 10/2001 Maruyama et al. ........... 361/511
6,558,436 B1 *  5/2003 Greenwood et al. ......... 29/25.03

FOREIGN PATENT DOCUMENTS

CN    2785109 Y       5/2006
JP    2007180432 A  *  7/2007

* cited by examiner

*Primary Examiner* — Eric Thomas
(74) *Attorney, Agent, or Firm* — Rosenberg, Klein & Lee

(57) ABSTRACT

A radial lead aluminum electrolytic capacitor includes a wound unit, a case provided with an opening and containing the wound unit impregnated by electrolyte and a seal for sealing up the opening of the case. The wound unit includes a cathode formed foil; an anode foil; a first separator; a second separator; a first lead wire stitched to the cathode foil; and a second lead wire stitched to the anode foil. The wound unit is formed by winding a lamination made by those elements. Gasket formed foils may be arranged at the stitching places of the first lead wire and the second lead wire or a gasket formed foil is arranged only at a stitching place of the first lead wire.

15 Claims, 3 Drawing Sheets

RADIAL LEAD ALUMINUM ELECTROLYTIC CAPACITOR

CROSS-REFERENCE TO RELATED APPLICATION

This application is based upon and claims priority to Chinese Patent Application No. 200810110683.0 filed on Jun. 13, 2008, which application is expressly incorporated herein by reference.

BACKGROUND OF THE INVENTION

1. Field of the Invention

The present invention relates to an aluminum electrolytic capacitor, and in particular, relates to a radial lead aluminum electrolytic capacitor with/without gasket foil(s).

2. Description of Related Art

Common aluminum electrolytic capacitor generally comprises a lead wire, a cathode foil, an anode foil and a separator, wherein the lead wire is stitched to the corresponding cathode foil or the corresponding anode foil, and the separator is set between the cathode foil and the anode foil. In practical processing, the stitching places between the anode foil and the corresponding lead wire as well as the cathode foil and the corresponding lead wire are generally adopting stitching or cold welding, which easily cause burrs. And when the cathode foil, the anode foil and the separator are winded to form a wound unit, the burrs will perforate the separator, so that there is fire striking in the electrified common aluminum electrolytic capacitor or the common aluminum electrolytic capacitor in use, which leads to short circuit or explosion of the common aluminum electrolytic capacitor.

For overcoming the deficiency of the common aluminum electrolytic capacitor, an aluminum electrolytic capacitor with gasket foil is disclosed in China patent application CN 200520054439.9. The aluminum electrolytic capacitor comprises two lead wires and plurality of layers of the aluminum foils (anode and cathode foils) and separator, wherein the lead wires are stitched with the aluminum foils (anode and cathode foils), and the separator is set between two layers of the aluminum foils (anode and cathode foils). The lead wire and the surface of the aluminum foils (anode and cathode foil) are provided with gasket foils, one end of the gasket foil is stitched to the aluminum foil (anode and cathode foil), and the other end is in manner of freely extending (in other case, the gasket foil may be arranged only on the surface of the cathode foil). The gasket foil can be winded together with the aluminum foil (anode and cathode foil) and separator to form a wound unit. Compared with the common aluminum electrolytic capacitor, said aluminum electrolytic capacitor adopts gasket foil as a protection, to prevent the burrs of the aluminum foil from perforating the separator, and consequently to prevent short circuit and explosion of the common aluminum electrolytic capacitor by fire striking in the electrified common aluminum electrolytic capacitor or the common aluminum electrolytic capacitor in use; besides, compared with the common aluminum electrolytic capacitor, said aluminum electrolytic capacitor with gasket foil is resistant to high ripple current and has more times of charging/discharging. However, said aluminum electrolytic capacitor with gasket foil has the same deficiency as the common aluminum electrolytic capacitor has, which is not resistant to inverse voltage and high temperature.

Either the common aluminum electrolytic capacitor or said aluminum electrolytic capacitor with gasket foil must be processed with anode formed foil to form dielectric oxide film on the surface of the anode foil, so that the anode foil can be resistant to rated voltage. The anode formed foil is produced by processing aluminum product to original foil, and then etching the original foil on the surface to form etched foil to increase the surface area of the original foil, then oxidizing the etched foil to form a film of $Al_2O_3$ on the surface of the etched foil. The $Al_2O_3$ film of the anode foil is used as dielectric in producing the aluminum electrolytic capacitor.

Regarding the aluminum electrolytic capacitor, there are anode foil and cathode foil. Normally, cathode foil does not need forming processing, and its surface is natural oxide film, which has a certain voltage resistance (1-1.5V) in normal temperature. However, because of the inhomogeneity and instability of the film, the voltage resistance of the cathode foil can hardly be ensured, especially in high temperature. When the aluminum electrolytic capacitor is imposed by inverse voltage of its polarity, the water in the electrolyte will be electrolyzed into oxygen, which is be propitious to repair the oxide film of the cathode foil and enhance forming characteristics, because there is 1%~5% water in the common electrolyte adopted by the present aluminum electrolytic capacitor. However, water easily interacts with aluminum (especially in high temperature), to bring hydration and form $Al_2O_3$ film on the surface of cathode foil, and the interaction will reduce the capacitance of the cathode foil, and decrease synthesis capacitance of anode and cathode foil, so that the capacitance of the capacitor decreases; besides, because of the hydrogen produced by the interaction of water and aluminum in the inner of the capacitor, the inner pressure of the capacitor increases. When the imposed inverse voltage increases, the temperature around the capacitor rises and the more gas is produced; meanwhile, the increased voltage and its surrounding temperature expand the case of the capacitor, sometimes loosen or even open security device (for example case vent), and there is possibility that the capacitor loses its function.

Similarly, since the surface of the gasket foil is natural film without further forming processing, there exists the same problem in the aluminum electrolytic capacitor with gasket foil.

BRIEF SUMMARY OF THE INVENTION

In order to overcome the above deficiencies, one object of the present invention is to provide a radial lead aluminum electrolytic capacitor, which is resistant to inverse voltage and higher temperature, and sequentially resistant to higher ripple current and has more times of charging/discharging.

In order to overcome the above deficiencies, another object of the present invention is to provide a radial lead aluminum electrolytic capacitor, which not only retains the advantages of the conventional radial lead aluminum electrolytic capacitor with gasket foil(s), but also resists high ripple current and has more times of charging/discharging.

To achieve said one object of the present invention, the present invention provides a radial lead aluminum electrolytic capacitor comprising: a wound unit, a case provided with an opening and containing the wound unit impregnated by electrolyte; and a seal for sealing up the opening of the case. Furthermore, the wound unit comprises: a cathode foil; an anode foil; a first separator; a second separator; a first lead wire stitched to the cathode foil; and a second lead wire stitched to the anode foil; wherein the wound unit is formed by winding a lamination in which the anode foil and the cathode foil are alternately laminated with the first separator and the second separator so that the second separator is interposed between the anode foil and the cathode foil, while the cathode foil is interposed between the first separator and the second separator. The cathode foil is a cathode formed foil. Therefore, the radial lead aluminum electrolytic capacitor of the present invention is resistant to inverse voltage and higher temperature, and sequentially resistant to high ripple current and has more times of charging/discharging.

To achieve said another object of the present invention, the present invention provides a radial lead aluminum electrolytic capacitor comprising: a wound unit; a case provided with an opening and containing the wound unit impregnated by electrolyte; and a seal for sealing up the opening of the case. Furthermore, the wound unit comprises: a cathode foil; an anode foil; a first separator; a second separator; a first lead wire stitched to the cathode foil; a second lead wire stitched to the anode foil; a first gasket foil arranged at and covering a stitching place where the first lead wire is stitched to the cathode foil; and a second gasket foil arranged at and covering a stitching position where the second lead wire is stitched to the anode foil; wherein the wound unit is formed by winding a lamination in which the anode foil and the cathode foil are alternately laminated with the first separator and the second separator so that the second separator is interposed between the anode foil and the cathode foil, while the cathode foil is interposed between the first separator and the second separator. The cathode foil is a cathode formed foil, and the first gasket foil and the second gasket foil are gasket formed foils. Therefore, the radial lead aluminum electrolytic capacitor of the present invention not only retains the advantages of the current radial lead aluminum electrolytic capacitor with gasket foils, but also resists high ripple current and has more times of charging/discharging.

To achieve said another object of the present invention, the present invention provides another radial lead aluminum electrolytic capacitor comprising: a wound unit; a case provided with an opening and containing the wound unit impregnated by electrolyte; and a seal for sealing up the opening of the case. Furthermore, the wound unit comprises: a cathode foil; an anode foil; a first separator; a second separator; a first lead wire stitched to the cathode foil; a second lead wire stitched to the anode foil; and a first gasket foil arranged at and covering a stitching place where the first lead wire is stitched to the cathode foil; wherein the wound unit is formed by winding a lamination in which the anode foil and the cathode foil are alternately laminated with the first separator and the second separator so that the second separator is interposed between the anode foil and the cathode foil, while the cathode foil is interposed between the first separator and the second separator. The cathode foil is a cathode formed foil, and the first gasket foil is gasket formed foil. Therefore, the radial lead aluminum electrolytic capacitor of the present invention not only retains the advantages of the current radial lead aluminum electrolytic capacitor with a gasket foil, but also resists high ripple current and has more times of charging/discharging.

In the radial lead aluminum electrolytic capacitors of the present invention, a resistant voltage of the gasket formed foil of the first gasket foil is equal to or greater than a resistant voltage of the cathode formed foil. Preferably, the cathode formed foil and the gasket formed foil of the first gasket foil have a forming voltage of 2-7V and a hydration withstanding time of above 12 hours, so that the cathode formed foil is protected, and the voltage resistance and high temperature resistance of the radial lead aluminum electrolytic capacitors of the present invention is further improved.

In the radial lead aluminum electrolytic capacitors of the present invention, preferably, a resistant voltage of the gasket formed foil of the second gasket foil is equal to or greater than a resistant voltage of the anode formed foil.

In the radial lead aluminum electrolytic capacitors of the present invention, preferably, a thickness of the gasket formed foil of the first gasket foil is equal to or greater than a thickness of the cathode formed foil.

In the radial lead aluminum electrolytic capacitors of the present invention, preferably, a thickness of the gasket formed foil of the second gasket foil is equal to or greater than the thickness of the cathode formed foil.

In the radial lead aluminum electrolytic capacitors of the present invention, preferably, a density of the first separator and a density of the second separator are equal or greater than $0.6 \text{ g/cm}^3$, and a thickness of the first separator and a thickness of the second separator are equal or greater than 40 µm, so that the voltage-resistance capability of the radial lead aluminum electrolytic capacitors of the present invention is ensured.

In the radial lead aluminum electrolytic capacitors of the present invention, preferably, a length of burrs of the anode foil and a length of burrs of the cathode formed foil after cut are shorter than 20 µm, so that short-circuit in the radial lead aluminum electrolytic capacitors caused by too long burrs is prevented.

In the radial lead aluminum electrolytic capacitors of the present invention, preferably, the density of the first separator and the density of the second separator are in a range of $0.60$-$0.85 \text{ g/cm}^3$, and the thickness of the first separator and the thickness of the second separator are in a range of 40-80 µm.

In the radial lead aluminum electrolytic capacitors of the present invention, preferably, the first gasket foil for covering the stitching place where the first lead wire is stitched to the cathode foil is freely laid on the stitching place, so that the wound unit may be smoothly wound. Alternatively, the first gasket foil for covering the stitching place of the cathode foil and the first lead wire is arranged at the stitching place in a manner that one end of the first gasket foil is stitched to the cathode foil and the other end the first gasket foil is freely extending, so that the wound unit may be smoothly wound.

In the radial lead aluminum electrolytic capacitors of the present invention, preferably, the second gasket foil for covering the stitching position where the second lead wire is stitched to the anode foil is freely laid on the stitching position, so that the wound unit may be smoothly wound. Alternatively, the second gasket foil for covering the stitching position of the second lead wire and the anode foil is arranged at the stitching position in a manner that one end of the second gasket foil is stitched to the anode foil and the other end of the second gasket foil is freely extending, so that the wound unit may be smoothly wound.

BRIEF DESCRIPTION OF THE DRAWINGS

The accompanying drawings, which are included to provide a further understanding of the invention and are incorporated in and constitute a unit of this application document, illustrate embodiments of the invention and together with the description serve to explain the principles of the invention. In the drawings.

DETAILED DESCRIPTION OF THE INVENTION

The embodiments of a radial lead aluminum electrolytic capacitor of the present invention will be set forth in details with reference to the accompanying drawings.

The First Embodiment

Figure 1:
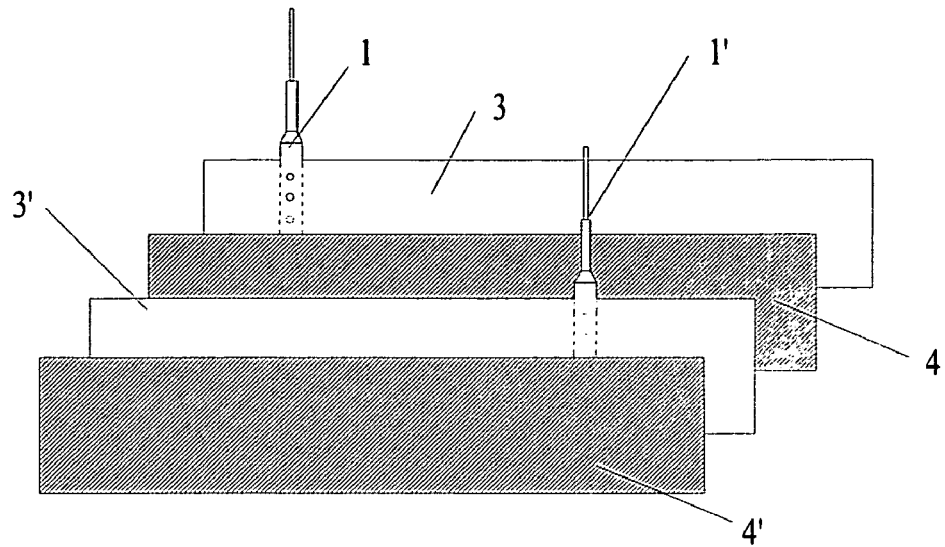
FIG. 1 is an exploded view of a wound unit of a radial lead aluminum electrolytic capacitor in a first embodiment of the present invention.
Figure 2:
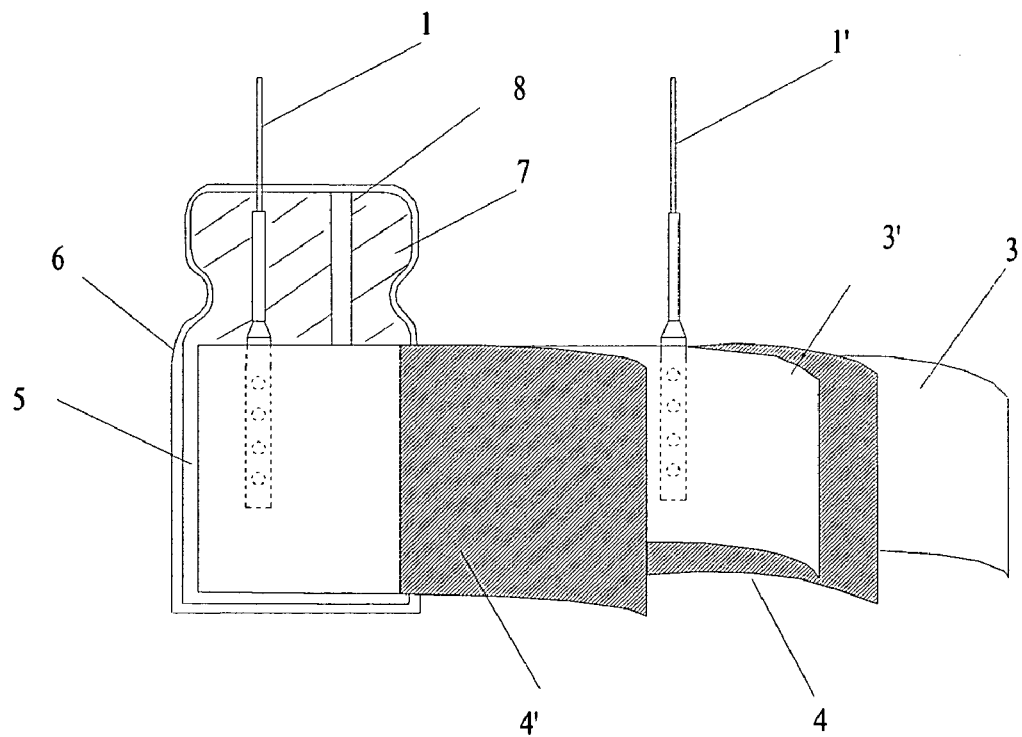
FIG. 2 is a winding view of the wound unit of the radial lead aluminum electrolytic capacitor in the first embodiment of the present invention.

FIG. 1 is the exploded view of a wound unit of a radial lead aluminum electrolytic capacitor in a first embodiment of the present invention; and FIG. 2 is the winding view of the wound unit of, the radial lead aluminum electrolytic capacitor in the first embodiment of the present invention.

As shown in FIG. 1 and FIG. 2, a radial lead aluminum electrolytic capacitor in the first embodiment of the present invention comprises: a wound unit 5; a case 6 provided with an opening 8 and containing the wound unit 5 impregnated by electrolyte; and a seal 7 for sealing up the opening 8 of the case 6. Furthermore, the wound unit 5 comprises: a cathode foil 3'; an anode foil 3; a first separator 4'; a second separator 4; a first lead wire 1' stitched to the cathode foil 3'; and a second lead wire 1 stitched to the anode foil 3; wherein the wound unit 5 is formed by winding a lamination in which the anode foil 3 and the cathode foil 3' are alternately laminated with the first separator 4' and the second separator 4 so that the second separator 4 is interposed between the anode foil 3 and the cathode foil 3', while the cathode foil 3' is interposed between the first separator 4' and the second separator 4.

In the radial lead aluminum electrolytic capacitor in the first embodiment of the present invention, in order to enable the electrolytic capacitor to be resistant to inverse voltage, the cathode foil 3' is a cathode formed foil. Preferably, the cathode formed foil has a forming voltage (i.e. resistant voltage) of 2-7V and a hydration withstanding time of above 12 hours.

As a layer of oxide film, whose resistant voltage is 2-7V, is formed on the surface of cathode formed foil, when there is higher ripple current, the radial lead aluminum electrolytic capacitor of the present invention is capable of resisting higher inverse voltage than normal products. That is to say, the aluminum electrolytic capacitor of the present invention is resistant to higher ripple current. Since the cathode formed foil is protected by the oxide film, which mitigates the interaction between the aluminum and the water in the electrolyte, the high temperature resistance of the aluminum electrolytic capacitor is improved.

The Second Embodiment

On the basis of the radial lead aluminum electrolytic capacitor in the first embodiment of the present invention, the present invention may further provide a radial lead aluminum electrolytic capacitor with gasket formed foils.

Figure 3:
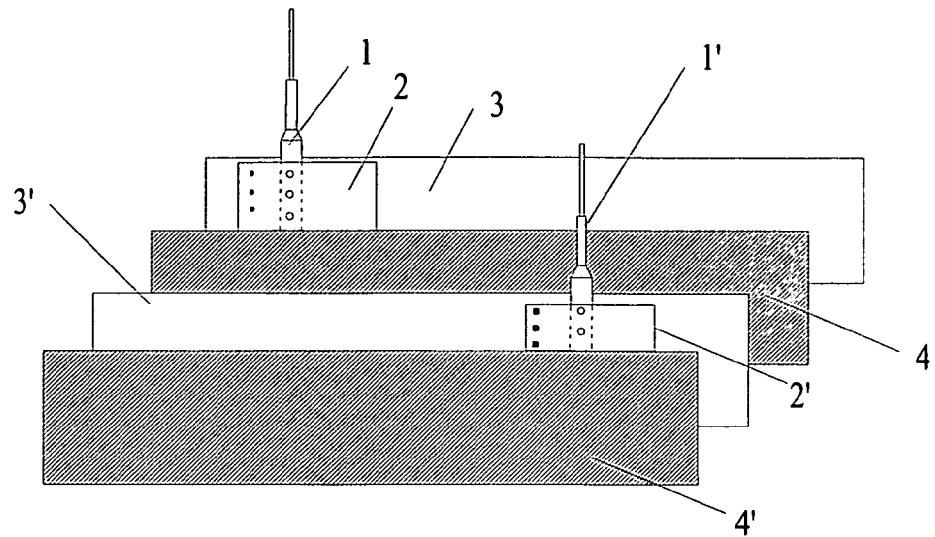
FIG. 3 is an exploded view of a wound unit of a radial lead aluminum electrolytic capacitor in a second embodiment of the present invention.
Figure 4:
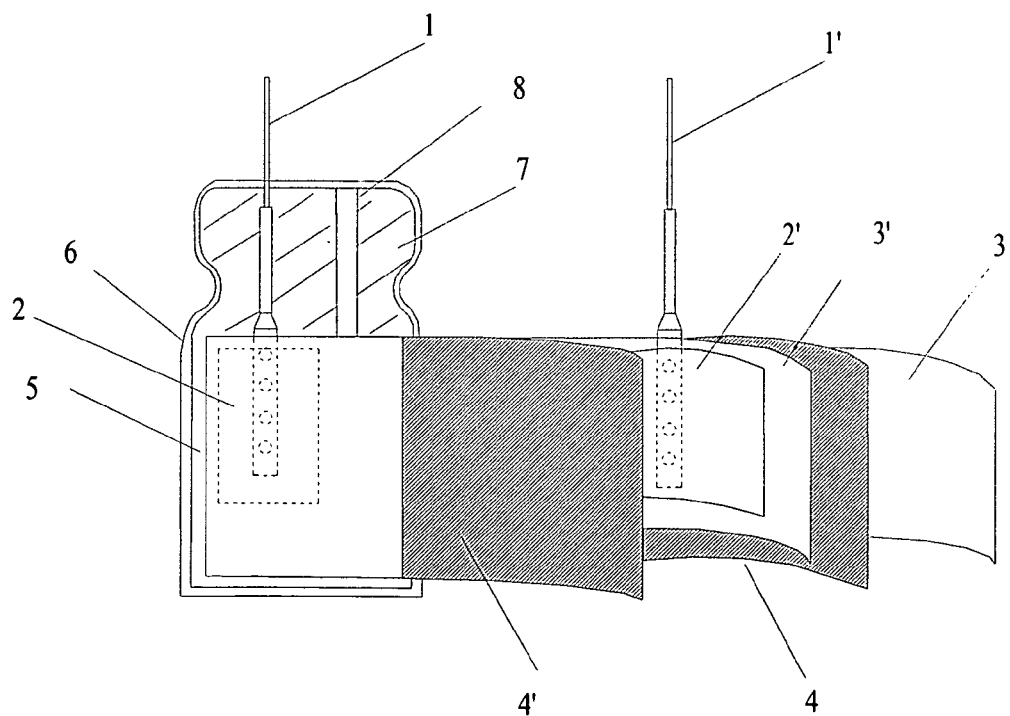
FIG. 4 is a winding view of the wound unit of the radial lead aluminum electrolytic capacitor in the second embodiment of the present invention.

FIG. 3 is the exploded view of a wound unit of a radial lead aluminum electrolytic capacitor in a second embodiment of the present invention; and FIG. 4 is the winding view of the wound unit of the radial lead aluminum electrolytic capacitor in the second embodiment of the present invention.

As shown in FIG. 3 and FIG. 4, the radial lead aluminum electrolytic capacitor in the second embodiment of the present invention comprises: a wound unit 5; a case 6 provided with an opening 8 and containing the wound unit 5 impregnated by electrolyte; and a seal 7 for sealing up the opening 8 of the case 6. Furthermore, the wound unit 5 comprises: a cathode foil 3'; an anode foil 3; a first separator 4'; a second separator 4; a first lead wire 1' stitched to the cathode foil 3'; a second lead wire 1 stitched to the anode foil 3; a first gasket foil 2' arranged at and covering a stitching place where the first lead wire 1' is stitched to the cathode foil 3'; and a second gasket foil 2 arranged at and covering a stitching position where the second lead wire 1 is stitched to the anode foil 3; wherein the wound unit 5 is formed by winding a lamination in which the anode foil 3 and the cathode foil 3' are alternately laminated with the first separator 4' and the second separator 4 so that the second separator 4 is interposed between the anode foil 3 and the cathode foil 3', while the cathode foil 3' is interposed between the first separator 4' and the second separator 4.

In the radial lead aluminum electrolytic capacitor in the second embodiment of the present invention, in order to enable the electrolytic capacitor to be resistant to inverse voltage, the cathode foil 3' is a cathode formed foil, and the first gasket foil 2' and the second gasket foil 2 are gasket formed foils.

Since the current impact produced during the charging and discharging process acts on the gasket formed foils firstly, in order to protect the cathode formed foil and further improve the voltage-resistant performance of the radial lead aluminum electrolytic capacitor of the present invention, it is preferable that a resistant voltage of the gasket formed foil of the first gasket foil 2' is equal to or greater than a resistant voltage of the cathode formed foil, and a resistant voltage of the gasket formed foil of the second gasket foil 2 is equal to or greater than a resistant voltage of the anode formed foil 3. Preferably, the cathode formed foil and the gasket formed foil of the first gasket foil 2' have a forming voltage (i.e. resistant voltage) of 2-7V and a hydration withstanding time of above 12 hours. Furthermore, preferably, a thickness of the gasket formed foil of the first gasket foil 2' is equal to or greater than a thickness of the cathode formed foil, and a thickness of the gasket formed foil of the second gasket foil 2 is equal to or greater than the thickness of the cathode formed foil.

As a layer of oxide film, whose resistant voltage is 2-7V, is formed on the surface of cathode formed foil, when there is higher ripple current, the radial lead aluminum electrolytic capacitor in the second embodiment of present invention is capable of resisting higher inverse voltage than normal products and the conventional aluminum electrolytic capacitor with gasket foils. That is to say, the radial lead aluminum electrolytic capacitor in the second embodiment of present invention is resistant to higher ripple current. Because the cathode formed foil as well as the gasket formed foils are protected by the oxide films, which mitigates the interaction between the aluminum and the water in the electrolyte, the high temperature resistance of the radial lead aluminum electrolytic capacitor in the second embodiment of present invention is improved. Furthermore, due to the insulation of the gasket formed foils, the radial lead aluminum electrolytic capacitor of the present invention does not discharge directly on the stitching place of the cathode formed foil, but on the gasket formed foils, which increases the allowed times of charging/discharging.

In order to ensure the smoothly winding of the wound unit 5, there are several ways to arrange the first gasket foil 2' and the second gasket foil 2. The first way is that the first gasket foil 2' for covering the stitching place where the first lead wire 1' is stitched to the cathode foil 3' is freely laid on the stitching place, and the second gasket foil 2 for covering the stitching position where the second lead wire 1 is stitched to the anode foil 3 is freely laid on the stitching position. Alternatively, the first gasket foil 2' for covering the stitching place of the cathode foil 3' and the first lead wire 1' is arranged at the stitching place in a manner that one end of the first gasket foil 2' is stitched to the cathode foil 3' and the other end the first gasket foil 2' is freely extending; and the second gasket foil 2 for covering the stitching position of the second lead wire 1 and the anode foil 3 is arranged at the stitching position in a manner that one end of the second gasket foil 2 is stitched to the anode foil 3 and the other end of the second gasket foil 2 is freely extending.

The Third Embodiment

On the basis of the radial lead aluminum electrolytic capacitor in the second embodiment of the present invention, the present inventions further provide another radial lead aluminum electrolytic capacitor with a gasket formed foil.

In the second embodiment of the present invention, a second gasket foil 2 is arranged at a stitching position where the second lead wire 1 is stitched to the anode foil 3. It will not be necessary to do so by means of controlling burrs generated during the process that the second lead wire 1 is stitched to the anode foil 3, so that produce cost may be obviously reduced. With exception that it is not necessary to arrange a second gasket foil 2 at a stitching position where the second lead wire 1 is stitched to the anode foil 3, a radial lead aluminum electrolytic capacitor in a third embodiment of the present invention have the same structure as that of the radial lead aluminum electrolytic capacitor in the second embodiment of the present invention.

Figure 5:
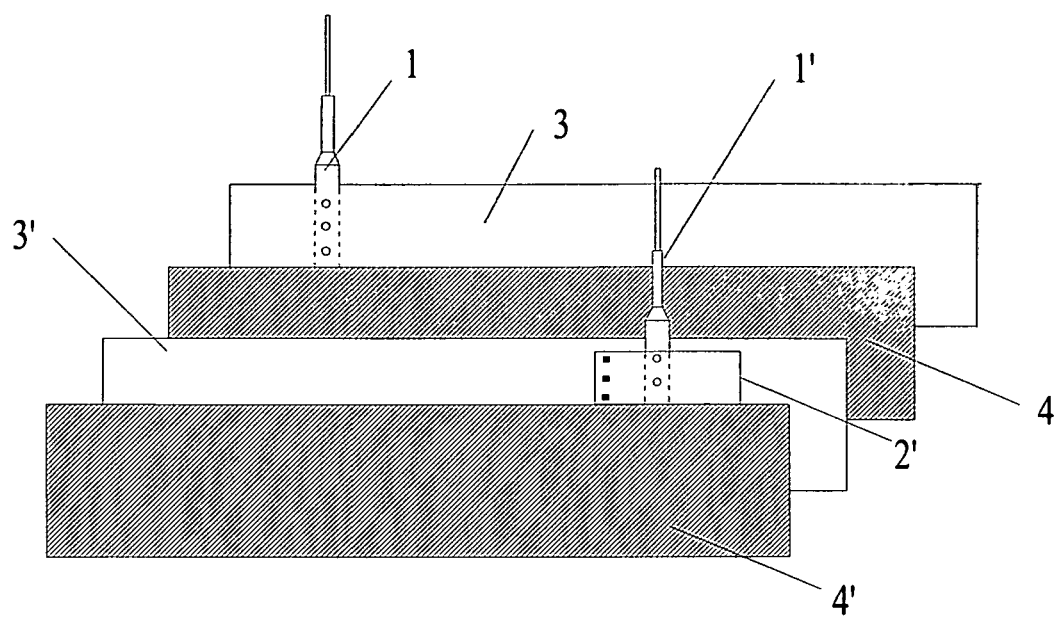
FIG. 5 is an exploded view of a wound unit of a radial lead aluminum electrolytic capacitor in a third embodiment of the present invention.
Figure 6:
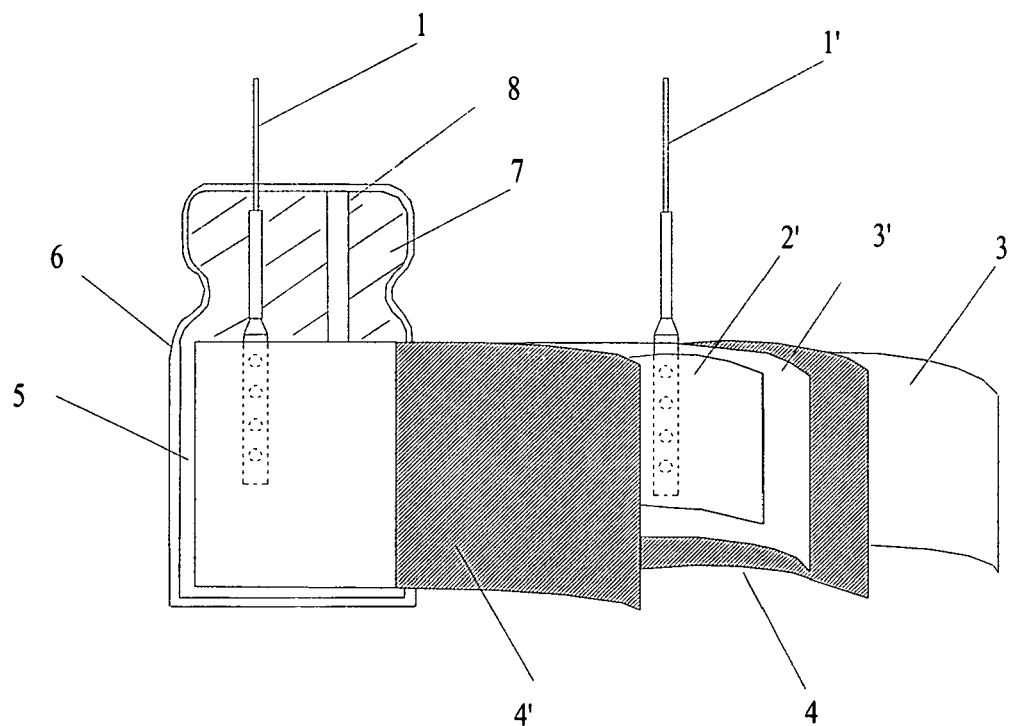
FIG. 6 is a winding view of the wound unit of the radial lead aluminum electrolytic capacitor in the third embodiment of the present invention.

FIG. 5 is the exploded view of a wound unit of the radial lead aluminum electrolytic capacitor in a third embodiment of the present invention; and FIG. 6 is the winding view of the wound unit of the radial lead aluminum electrolytic capacitor in the third embodiment of the present invention.

As shown in FIG. 5 and FIG. 6, the radial lead aluminum electrolytic capacitor in the third embodiment of the present invention comprises: a wound unit 5; a case 6 provided with an opening 8 and containing the wound unit 5 impregnated by electrolyte; and a seal 7 for sealing up the opening 8 of the case 6. Furthermore, the wound unit 5 comprises: a cathode foil 3'; an anode foil 3; a first separator 4'; a second separator 4; a first lead wire 1' stitched to the cathode foil 3'; a second lead wire 1 stitched to the anode foil 3; and a first gasket foil 2' arranged at and covering a stitching place where the first lead wire 1' is stitched to the cathode foil 3'; wherein the wound unit 5 is formed by winding a lamination in which the anode foil 3 and the cathode foil 3' are alternately laminated with the first separator 4' and the second separator 4 so that the second separator 4 is interposed between the anode foil 3 and the cathode foil 3', while the cathode foil 3' is interposed between the first separator 4' and the second separator 4.

In the radial lead aluminum electrolytic capacitor in the third embodiment of the present invention, in order to enable the electrolytic capacitor to be resistant to inverse voltage, the cathode foil 3' is a cathode formed foil, and the first gasket foil 2' is a gasket formed foil.

Since the current impact produced during the charging and discharging process acts on the gasket formed foil firstly, in order to protect the cathode formed foil and further improve the voltage-resistant performance of the radial lead aluminum electrolytic capacitor of the present invention, it is preferable that a resistant voltage of the gasket formed foil of the first gasket foil 2' is equal to or greater than a resistant voltage of the cathode formed foil. Preferably, the cathode formed foil and the gasket formed foil of the first gasket foil 2' have a forming voltage (i.e. resistant voltage) of 2-7V and a hydration withstanding time of above 12 hours. Furthermore, preferably, a thickness of the gasket formed foil of the first gasket foil 2' is equal to or greater than a thickness of the cathode formed foil.

As a layer of oxide film, whose resistant voltage is 2-7V, is formed on the surface of cathode formed foil, when there is higher ripple current, the radial lead aluminum electrolytic capacitor in the third embodiment of present invention is capable of resisting higher inverse voltage than normal products and the conventional aluminum electrolytic capacitor with a gasket foil. That is to say, the radial lead aluminum electrolytic capacitor in the third embodiment of present invention is resistant to higher ripple current. Because the cathode formed foil as well as the gasket formed foil are respectively protected by the corresponding oxide films, which mitigates the interaction between the aluminum and the water in the electrolyte, the high temperature resistance of the radial lead aluminum electrolytic capacitor in the third embodiment of present invention is improved. Furthermore, due to the insulation of the gasket formed foil, the radial lead aluminum electrolytic capacitor in the third embodiment of the present invention does not discharge directly on the stitching place of the cathode formed foil, but on the gasket formed foil, which increases the allowed times of charging/discharging.

In order to ensure the smoothly winding of the wound unit 5, there are several ways to arrange the first gasket foil 2'. One way is that the first gasket foil 2' for covering the stitching place where the first lead wire 1' is stitched to the cathode foil 3' is freely laid on the stitching place. Alternatively, the first gasket foil 2' for covering the stitching place of the cathode foil 3' and the first lead wire 1' is arranged at the stitching place in a manner that one end of the first gasket foil 2' is stitched to the cathode foil 3' and the other end the first gasket foil 2' is freely extending.

In addition, in the second embodiment and the third embodiment of the present invention, as the aluminum electrolytic capacitor with gasket foil(s) is suitable for a medium or high pressure condition, when an overrated voltage is imposed on the capacitor, the oxide film over the surface of the anode foil 3 cannot resist the overrated voltage, the oxide film is destroyed and consequently insulation capability thereof is reduced, meanwhile fire strikes and burns the separator between the anode foil and the cathode foil. Therefore it enters a vicious circle that the current increases, the temperature rises, and the water in the electrolyte is heated up, accordingly pressure circumstance that the inner pressure is higher than the outer pressure is formed, and finally the aluminum electrolytic capacitor explodes. In order to further ensure the voltage-resistance capability of the radial lead aluminum electrolytic capacitors of the present invention, a density of the first separator 4' and a density of the second separator 4 are equal or greater than 0.6 g/cm$^3$, and a thickness of the first separator 4' and a thickness of the second separator 4 are equal or greater than 40 μm. Preferably, the density of the first separator 4' and the density of the second separator 4 are in a range of 0.60-0.85 g/cm$^3$, and the thickness of the first separator 4' and the thickness of the second separator 4 are in a range of 40-80 μm.

Moreover, in the above three embodiments of the present invention, in order to prevent the burrs from being so long to cause short-circuit of the radial lead aluminum electrolytic capacitor, a length of burrs of the anode foil 3 and a length of burrs of the cathode formed foil after cut are shorter than 20 μm.

Furthermore, in the above three embodiments of the present invention, case 6 may be made of metal, such as aluminum which is easy available from market and possesses favorable radiation capability.

Furthermore, in the above three embodiments of the present invention, the first separator 4' and the second separator 4 have at least one layer.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A radial lead aluminum electrolytic capacitor, comprising:
   a wound unit (5) comprising:
      a cathode foil (3'), the cathode foil being a cathode formed foil;
      an anode foil (3);
      a first separator (4');
      a second separator (4);
      a first lead wire (1') stitched to the cathode foil (3'); and
      a second lead wire (1) stitched to the anode foil (3);
      the wound unit (5) being formed by winding a lamination in which the anode foil (3) and the cathode foil (3') are alternately laminated with the first separator (4') and the second separator (4) so that the second separator (4) is interposed between the anode foil (3) and the cathode foil (3'), while the cathode foil (3') is interposed between the first separator (4') and the second separator (4);
   a case (6) provided with an opening (8) and containing the wound unit (5) impregnated by electrolyte;
   a seal (7) for sealing up the opening (8) of the case (6); and
   a first gasket foil (2') arranged at and covering a stitching place where the first lead wire (1') is stitched to the cathode foil (3'), the first gasket foil (2') being a gasket formed foil;
   wherein the cathode formed foil and the gasket formed foil of the first gasket foil (2') have a forming voltage of 2-7V and a hydration withstanding time of above 12 hours; and a thickness of the gasket formed foil of the first gasket foil (2') is equal to or greater than a thickness of the cathode formed foil.

2. The radial lead aluminum electrolytic capacitor according to claim 1, wherein a resistant voltage of the gasket formed foil of the first gasket foil (2') is equal to or greater than a resistant voltage of the cathode formed foil.

3. The radial lead aluminum electrolytic capacitor according to claim 1, wherein a density of the first separator (4') and a density of the second separator (4) are equal or greater than 0.6 g/cm$^3$, and a thickness of the first separator (4') and a thickness of the second separator (4) are equal or greater than 40 μm.

4. The radial lead aluminum electrolytic capacitor according to claim 3, wherein a length of burrs of the anode foil (3) and a length of burrs of the cathode formed foil after cut are shorter than 20 μm.

5. The radial lead aluminum electrolytic capacitor according to claim 3, wherein the density of the first separator (4') and the density of the second separator (4) are in a range of 0.60-0.85 g/cm$^3$, and the thickness of the first separator (4') and the thickness of the second separator (4) are in a range of 40-80 μm.

6. The radial lead aluminum electrolytic capacitor according to claim 1, wherein the first gasket foil (2') for covering the stitching place where the first lead wire (1') is stitched to the cathode foil (3') is freely laid on the stitching place.

7. The radial lead aluminum electrolytic capacitor according to claim 1, wherein the first gasket foil (2') for covering the stitching place of the cathode foil (3') and the first lead wire (1') is arranged at the stitching place in a manner that one end of the first gasket foil (2') is stitched to the cathode foil (3') and the other end of the first gasket foil (2') is freely extending.

8. The radial lead aluminum electrolytic capacitor according to claim 1, wherein a second gasket foil (2) arranged at and covering a stitching position where the second lead wire (1) is stitched to the anode foil (3), the second gasket foil (2) being a gasket formed foil.

9. The radial lead aluminum electrolytic capacitor according to claim 8, wherein a resistant voltage of the gasket formed foil of the first gasket foil (2') is equal to or greater than a resistant voltage of the cathode formed foil, and a resistant voltage of the gasket formed foil of the second gasket foil (2) is equal to or greater than a resistant voltage of the anode formed foil (3).

10. The radial lead aluminum electrolytic capacitor according to claim 8, wherein a thickness of the gasket formed foil of the second gasket foil (2) is equal to or greater than the thickness of the anode formed foil.

11. The radial lead aluminum electrolytic capacitor according to claim 8, wherein a density of the first separator (4') and a density of the second separator (4) are equal or greater than 0.6 g/cm$^3$, and a thickness of the first separator (4') and a thickness of the second separator (4) are equal or greater than 40 μm.

12. The radial lead aluminum electrolytic capacitor according to claim 11, wherein a length of burrs of the anode foil (3) and a length of burrs of the cathode formed foil after cut are shorter than 20 μm.

13. The radial lead aluminum electrolytic capacitor according to claim 11, wherein the density of the first separator (4') and the density of the second separator (4) are in a range of 0.60-0.85 g/cm$^3$, and the thickness of the first separator (4') and the thickness of the second separator (4) are in a range of 40-80 μm.

14. The radial lead aluminum electrolytic capacitor according to claim 8, wherein:
   the first gasket foil (2') for covering the stitching place where the first lead wire (1') is stitched to the cathode foil (3') is freely laid on the stitching place; and
   the second gasket foil (2) for covering the stitching position where the second lead wire (1) is stitched to the anode foil (3) is freely laid on the stitching position.

15. The radial lead aluminum electrolytic capacitor according to claim 8, wherein:
   the first gasket foil (2') for covering the stitching place of the cathode foil (3') and the first lead wire (1') is arranged at the stitching place in a manner that one end of the first gasket foil (2') is stitched to the cathode foil (3') and the other end the first gasket foil (2') is freely extending; and the second gasket foil (2) for covering the stitching position of the second lead wire (1) and the anode foil (3) is arranged at the stitching position in a manner that one end of the second gasket foil (2) is stitched to the anode foil (3) and the other end of the second gasket foil (2) is freely extending.

* * * * *